United States Patent
Sugimoto

(10) Patent No.: US 6,605,155 B2
(45) Date of Patent: Aug. 12, 2003

(54) REMOVER FOR SCALE DEPOSITED ON TITANIUM MATERIAL

(75) Inventor: Takeshi Sugimoto, Habikino (JP)

(73) Assignee: Seiwa Pro Co., Ltd., Matsubara (JP)

( * ) Notice: Subject to any disclaimer, the term of this patent is extended or adjusted under 35 U.S.C. 154(b) by 0 days.

(21) Appl. No.: 10/181,813

(22) PCT Filed: Feb. 21, 2001

(86) PCT No.: PCT/JP01/01275

§ 371 (c)(1), (2), (4) Date: Jul. 23, 2002

(87) PCT Pub. No.: WO02/066385

PCT Pub. Date: Aug. 29, 2002

(65) Prior Publication Data
US 2003/0050207 A1 Mar. 13, 2003

(51) Int. Cl.$^7$ ................................................. C23G 1/02
(52) U.S. Cl. .................... 134/3; 134/2; 134/22.1; 134/22.12; 134/22.13; 134/22.14; 134/22.8; 134/22.19; 134/34; 134/36; 134/41; 134/42; 510/245; 510/247; 510/195; 510/434; 510/497; 510/488; 510/492
(58) Field of Search .................... 134/2, 3, 22.1, 134/22.12, 22.13, 22.14, 22.18, 22.19, 34, 36, 41, 42; 510/245, 247, 195, 434, 477, 492, 488

(56) References Cited

U.S. PATENT DOCUMENTS

| | | | | |
|---|---|---|---|---|
| 4,238,244 A | * | 12/1980 | Banks | 134/22.18 |
| 4,828,743 A | * | 5/1989 | Rahfield et al. | 510/363 |
| 4,906,384 A | * | 3/1990 | Hamilton | 210/697 |
| 5,045,211 A | * | 9/1991 | Hamilton | 210/697 |
| 6,458,214 B1 | * | 10/2002 | Kanda et al. | 134/21 |
| 6,484,736 B1 | * | 11/2002 | Kanda et al. | 134/109 |
| 2002/0139399 A1 | * | 10/2002 | Kanda et al. | 134/21 |

FOREIGN PATENT DOCUMENTS

| | | | |
|---|---|---|---|
| CA | 1246548 | * | 3/2000 |
| JP | 49-9944 | | 3/1974 |
| JP | 49-47606 | | 12/1974 |
| JP | 11188388 | * | 7/1999 |
| JP | 2000-63890 | | 2/2000 |
| JP | 2000-64069 | | 2/2000 |
| SU | 1382877 | * | 3/1988 |

* cited by examiner

Primary Examiner—Sharidan Carrillo
(74) Attorney, Agent, or Firm—Armstrong, Westerman & Hattori, LLP

(57) ABSTRACT

A descaling composition for use in removing scale deposited on a member made of titanium or a titanium alloy, the descaling composition containing a hydroxycarboxylic acid, a sulfamic acid and ammonium sulfate as effective components and effectively inhibiting titanium ions from dissolving out.

1 Claim, 1 Drawing Sheet

REMOVER FOR SCALE DEPOSITED ON TITANIUM MATERIAL

TECHNICAL FIELD

The present invention relates to descaling compositions, and more particularly to compositions for removing scale deposited and accumulating on the inner surfaces of titanium drainpipes.

BACKGROUND ART

Water-insoluble organic matter resulting from the decomposition of food waste and calcium compounds produced by the decomposition of urine are deposited, for example, on the inner surfaces of drainpipes of kitchens and toilets. These deposits are generally termed scale and impedes the flow of drain. When the piping system has a small pipe diameter and many bent portions, the accumulation of scale will clog up the drainpipe.

The drainpipes for the kitchens and toilets in aircraft are under structural limitations of the fuselage and therefore have a piping structure comprising small pipes in a complex arrangement confined within a narrow space. The drainpipes are descaled frequently to avoid clogging. However, use of an inorganic acid, such as hydrochloric acid or sulfuric acid, which is strongly acidic and highly effective for removing scale not only causes degradation of the material of the drainpipe due to corrosion but also gives rise to environmental pollution due to the waste water resulting from washing. On the other hand, acetic acid or like weak acid, if used, fails to produce a satisfactory descaling effect and accordingly entails the necessity of periodically removing the drainpipe to physically descale the inside of the pipe. This work is uncomfortable and difficult and requires a long period of time, possibly causing trouble to the flight schedule.

We have already developed a descaling composition adapted to effectively dissolve scale for removal without using any strongly acidic inorganic acid (JP-A No. 2000-63890). This composition contains a hydroxycarboxylic acid and a sulfamic acid as effective components, is not only low in corrosive activity on the pipe material but also excellent in biodegradable properties and is therefore unlikely to cause environmental pollution. Initially this descaling composition was developed as a denture cleaning agent for removing plaque and tartar from dentures by dissolving. However, when the composition was used for removing scale from the drainpipes of galleys and toilets in aircraft since plaque and tartar consist generally of the same components as the scale on drainpipes, the composition was found to exhibit also an outstanding effect of descaling.

In addition to corrosion resistance, lightweightness is also required of the galleys and toilets in aircraft as important properties, so that titanium or a titanium alloy containing titanium and other metal elements (hereinafter referred to merely as "titanium material") is favorably used for making these pipes. The titanium material has very high corrosion resistance because a titanium oxide coating, which exhibits high adhesion to the surface of the titanium material, is instantaneously formed on the titanium material when the material is exposed to the atmosphere to protect the base material with the coating. The titanium oxide coating is nevertheless easily removable if brought into contact with a chemical agent containing a strong acid since the coating has a very small thickness. When a strongly acidic descaling agent is used for removing scale, the scale is removed first, and the underlying oxide film is subsequently removed. If the application of the descaling agent is continued in this state, the surface of the titanium material is corrosively acted on by the descaling agent to release titanium ions into the agent on dissolving. If the application of the descaling agent is discontinued on completion of removal of the scale, titanium ions can be inhibited from dissolving out, whereas difficulty is actually encountered in controlling the work at such good timing. For this reason, it is actually impossible to obviate dissolving out of titanium ions in removing scale from drainpipes of titanium material.

An object of the present invention is to provide a composition for removing scale deposited on drainpipes of titanium material which composition has excellent activity to dissolve the scale while effectively inhibiting titanium ions from dissolving out (having a reduced likelihood of permitting titanium ions to dissolve out).

DISCLOSURE OF THE INVENTION

To fulfill the above object, the present invention provides a descaling composition characterized in that the composition contains ammonium sulfate as an effective component in addition to a hydroxycarboxylic acid and a sulfamic acid.

Preferably, the composition contains more than 0% to up to 5 wt. % of ammonium sulfate based on the combined amount by weight of the hydroxycarboxylic acid, the sulfamic acid and ammonium sulfate.

BEST MODE OF CARRYING OUT THE INVENTION

Figure 1:
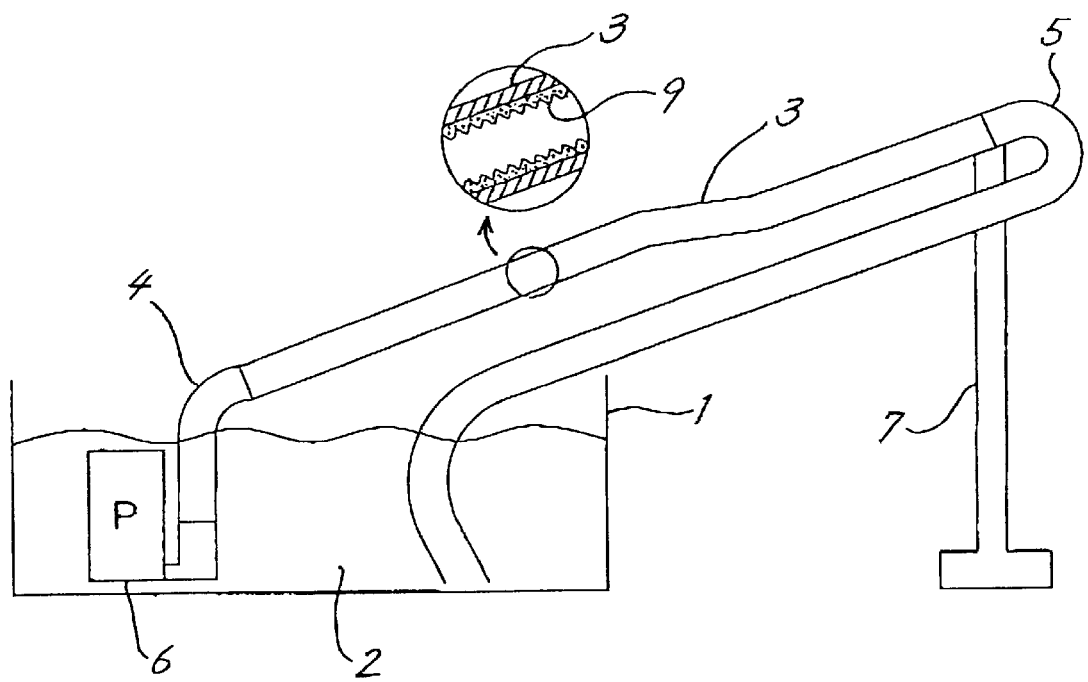
FIG. 1 is a diagram schematically showing a test arrangement for removing scale from the inner surface of a drainpipe removed from aircraft.

The present invention provides a descaling composition containing a hydroxycarboxylic acid, a sulfamic acid and ammonium sulfate as effective components. A detailed description will be given below.

The presence of the hydroxycarboxylic acid and the sulfamic acid gives the descaling composition of the invention outstanding properties to dissolve scale which contains calcium compounds, producing an excellent effect to remove the scale.

The term hydroxycarboxylic acid refers generally to acids having alcoholic hydroxyl and carboxyl in the molecule, such as glycolic acid, malic acid, lactic acid, tartaric acid, citric acid, hydroacrylic acid, α-hydroxybutyric acid, glyceric acid, tartronic acid and like aliphatic hydroxycarboxylic acids, and salicylic acid, m-hydroxybenzoic acid, p-hydroxybenzoic acid, gallic acid, mandelic acid and tropic acid and like aromatic hydroxycarboxylic acids. These examples are not limitative. Malic acid and citric acid are preferred. These hydroxycarboxylic acids are usable singly, or at least two of them can be used at the same time when so desired.

The sulfamic acid to be used favorably is amidosulfonic acid but is not limited to this acid. When amidosulfonic acid is to be used, it is desirable to use an N-alkyl or N-aryl derivative thereof which is highly soluble in water among other derivatives thereof.

The hydroxycarboxylic acid and sulfamic acid to be used in the present invention need only to be those which are safe to use over a long period of time, and are preferably those which are solid at room temperature. More preferably these acids have a structure resembling that of those naturally occurring and are those easily biodegradable.

The ratio by weight of the hydroxycarboxylic acid to the sulfamic acid is preferably 1:9 to 9:1, more preferably 1:9 to 7:3.

The descaling composition of the present invention is characterized in that the composition contains ammonium sulfate. We have found that ammonium sulfate has activity to inhibit titanium ions from dissolving out from the surface of the titanium material without impairing the descaling activity of the hydroxycarboxylic acid and sulfamic acid. It is desired that the composition contain more than 0% to up to 5 wt. % of ammonium sulfate based on the combined amount of the hydroxycarboxylic acid, the sulfamic acid and ammonium sulfate.

When an immediate effect to dissolve scale is required of the descaling composition of the present invention, it is desirable to obtain the composition in the form of a powder or granules and uniformly mix the composition with water for use as an aqueous solution. The concentration of the aqueous solution is preferably about 50 g to about 200 g (corresponding to about 5 to about 17 wt. % aqueous solution), more preferably about 100 g to about 140 g (corresponding to about 9 to about 12 wt. % of aqueous solution), of the combined amount of the hydroxycarboxylic acid, the sulfamic acid and ammonium sulfate per 1000 ml of water.

To sustain the descaling effect over a prolonged period of time, on the other hand, the composition can be formed into a suitable shape using a binder acting to retard dissolving of the hydroxycarboxylic acid and the sulfamic acid in water. The time taken for dissolving in water can be controlled suitably according to the amount of the binder used.

Examples of binders usable are starch, carboxymethyl cellulose (CMC), carboxymethyl cellulose sodium (CMC-Na), polyvinyl pyrrolidone (PVP), hydroxypropyl cellulose (HPC), hydroxypropylmethyl cellulose (HPMC), methyl cellulose (MC), hydroxypropyl starch (HPS), etc. However, these examples are not limitative.

The composition can be formed by mixing together a powder of hydroxycarboxylic acid, a powder of sulfamic acid and ammonium sulfate to obtain a base mixture, uniformly mixing 5 to 100 parts by weight of a powder of binder with 100 parts by weight of the base mixture, and forming the resulting mixture into a specified shape by a tableting machine.

When desired, the descaling composition of the invention can be used as admixed with an oxidizer, surfactant, enzyme, chelating agent, etc.

When the descaling composition of the present invention is to be used for removing scale deposited on the inner surface of the drainpipe of the galley or toilet in aircraft, the composition is first dissolved in water to prepare an aqueous solution of the composition. When applied to the drainpipe of the galley or toilet from a drain opening, the solution passes through the drainpipe while dissolving the scale on the pipe inner surface and reaches a drain outlet at a lower portion of the aircraft. Since the solution at this position contains the scale removed from the drainpipe, the solution is then passed through a separator to separate off the scale and place the separated scale into a specified container. The aqueous solution free from the scale is returned to the drain opening of the galley or toilet again and passed through the drainpipe. The time required for removing the scale by recycling the aqueous solution of the composition is dependent on the size of the aircraft and the degree of deposition of scale.

The invention will be described below with reference to specific examples.

EXAMPLE 1

Test pellets (5 mm in diameter) of various calcium compounds were prepared using a tableting machine, and the pellets of each calcium compound were immersed in various specimen solutions and checked for the state of dissolving.

The calcium compounds used for the dissolving test were calcium phosphate, calcium carbonate, calcium oxalate and calcium sulfate.

Table 1 shows the test results.

In Table 1, sample solution No. 1 is an embodiment of the invention which was prepared by dissolving 10 g of L-malic acid and 10 g of citric acid serving as hydroxycarboxylic acids, 5 g of amidosulfonic acid serving as a sulfamic acid and 1 g of ammonium sulfate in 500 ml of distilled water.

Sample solution No.2, which is a comparative example free from ammonium sulfate, was prepared by dissolving 10 g of L-malic acid and 10 g of citric acid serving as hydroxycarboxylic acids and 5 g of amidosulfonic acid serving as a sulfamic acid in 500 ml of distilled water.

Sample solution No. 3, which is an example of weak acid, was 500 ml of commercial vinegar.

Sample solution No. 4, which is an example of strongly acidic inorganic acid, was 500 ml of 5% hydrochloric acid.

TABLE 1

| | Results of calcium compound dissolving test | | | |
|---|---|---|---|---|
| Sample Solution | Calcium phosphate | Calcium carbonate | Calcium oxalate | Calcium sulfate |
| No. 1 | Finely divided in 30 min., dissolved in 3 hrs. | Finely divided in 30 min., dissolved in 3 hrs. | Finely divided in 30 min., dissolved in 3 hrs. | Finely divided in 30 min., dissolved in 3 hrs. |
| No. 2 | Finely divided in 30 min., dissolved in 3 hrs. | Finely divided in 30 min., dissolved in 3 hrs. | Finely divided in 30 min., dissolved in 3 hrs. | Finely divided in 30 min., dissolved in 3 hrs. |
| No. 3 | Almost no change | Almost no change | Almost no change | Almost no change |
| No. 4 | Finely divided in 30 min., dissolved in 3 hrs. | Finely divided in 30 min., dissolved in 3 hrs. | Finely divided in 30 min., dissolved in 3 hrs. | Finely divided in 30 min., dissolved in 3 hrs. |

With reference to the results of Table 1, sample solutions No. 1 and No.2 are almost equivalent to the hydrochloric acid of No. 4 in the time taken for dissolving the calcium compounds and are found to have high ability to dissolve the calcium compounds. Sample solution No. 3 has almost no effect to remove the calcium compounds.

As previously described, the scale deposited on the inner surfaces of drainpipes consists mainly of calcium compounds. It is seen that the descaling composition of the present invention has great ability to dissolve these calcium compounds and therefore an outstanding scale removing effect.

EXAMPLE 2

The drainpipe connected to the galley in aircraft was removed and checked for the removal of scale deposited on the inner surface of the pipe. The removed drainpipe was made of pure titanium, measured 2 inches (about 50 mm) in diameter and 92.6 inches (about 2350 mm) in length, and was locally bent gently. Scale was deposited to a thickness of about 2 to 5 mm at a pipe end.

FIG. 1 schematically shows an arrangement for the descaling test. With reference to FIG. 1, indicated at 1 is a tank containing an aqueous solution 2 of descaling composition of the invention. The aqueous solution 2 contains 800 g of L-malic acid and 800. g of citric acid serving as hydroxycarboxylic acids, 400 g of amidosulfonic acid serving as a sulfamic acid and 80 g of ammonium sulfate in 20 liters of water.

Indicated at 3 is the drainpipe having scale 9 deposited on the inner surface thereof. Tubes 4, 5 of semitransparent polyvinyl chloride were attached to the respective ends of the drainpipe 3. An end of the tube 4 is connected to a pump 6, while the other tube 5 was placed into the aqueous solution 2. The pump 6 used was of ⅙ hp and 17.5 gpm with a head of 5 feet. Indicated at 7 is a prop for supporting the drainpipe 3.

The pump 6 was operated to recycle the aqueous solution 2 of descaling composition in the tank 1 through the drainpipe 3. Three hours later, the pump 6 was stopped, the tubes 4, 5 were removed, and the inner surface of the drainpipe was visually checked to find that the pipe was descaled almost completely.

EXAMPLE 3

Test pieces of pure titanium were immersed in the same sample solutions (500 ml in quantity and 25° C. in temperature) as used in Example 1 and checked for dissolving-out titanium ions. The quantity of dissolving-out titanium ions was measured by an atomic absorption photometer.

Used as the test pieces were hollow cylinders measuring 50 mm in inside diameter, 53 mm in outside diameter and 50 mm in length.

Table 2 shows the relationship between the test piece immersion time and the quantity of dissolving-out titanium ions.

TABLE 2

| Sample solution | Quantity of dissolving-out Ti ions ($\mu$g/ml) | | |
| --- | --- | --- | --- |
| | After 24-h immersion | After 48-h immersion | After 120-h immersion |
| No. 1 | 0.02 | 0.04 | 0.08 |
| No. 2 | 0.06 | 0.09 | 0.12 |
| No. 3 | 0.04 | 0.06 | 0.11 |
| No. 4 | 0.20 | 0.25 | 0.30 |

With reference to the results of Table 2, sample solution No. 1 of the invention is smaller than comparative sample solution No. 2 which is free from ammonium sulfate in the quantity of dissolving-out titanium ions. This indicates that ammonium sulfate has an effect to inhibit titanium ions from dissolving out.

As compared with sample solution No. 2, the vinegar of sample solution No. 3 is slightly smaller in the quantity of dissolving-out titanium ions, but has almost no effect to dissolve calcium compounds as shown in Example 1 and is not suited as a descaling agent.

Sample solution No. 4, hydrochloric acid, results in a large quantity of dissolving-out titanium ions, giving rise to the deterioration of titanium material.

The results of Examples 1 to 3 reveal that the descaling composition of the present invention has high activity to dissolve calcium compounds which form scale and inhibits titanium ions from dissolving out.

Accordingly, even when the descaling composition of the invention comes into contact with the titanium material of drainpipes after the scale deposited on the inner surfaces of the drainpipes has been removed with the descaling composition, titanium ions are inhibited from dissolving out from the titanium material. Thus the degradation of the pipes is prevented.

INDUSTRIAL APPLICABILITY

The descaling composition of the invention effectively inhibits titanium ions from dissolving out and is therefore useful for removing scale deposited on members made of titanium material, for example, on the inner surfaces of the drainpipes of galleys and toilets in aircraft. The descaling composition of the invention is useful also for removing scale from the walls of various pipes or tubes which are other members made of titanium material and included in heat exchangers, nuclear apparatus, etc.

What is claimed is:

1. A method of removing scale deposited on an inner surface of a drainpipe made of titanium or a titanium alloy, the method comprising:

a) providing a drainpipe made of titanium or a titanium alloy, said drainpipe being connected to a galley or a toilet in an aircraft; and b) removing scale from said inner surface of said drainpipe by injecting an aqueous descaling solution comprising at least a hydroxycarboxylic acid, a sulfamic acid, and ammonium sulfate into the drainpipe, said aqueous descaling solution dissolving the scale for removal while inhibiting said titanium or said titanium alloy from dissolving out from said drainpipe.

* * * * *